United States Patent
Münzenberger et al.

(10) Patent No.: US 6,426,463 B2
(45) Date of Patent: Jul. 30, 2002

(54) FIRE-PROTECTION SLEEVE FOR PIPES, CABLES AND THE LIKE

(75) Inventors: Herbert Münzenberger, Wiesbaden; Arndt Andresen, Landsberg/Lech, both of (DE); Jean-Louis Milhes, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/736,518

(22) Filed: Dec. 13, 2000

(30) Foreign Application Priority Data

Dec. 15, 1999 (DE) .......................... 199 60 485

(51) Int. Cl.[7] .............................................. H02G 15/04
(52) U.S. Cl. ..................................... 174/77 R; 277/627
(58) Field of Search ........................... 174/74 A, 77 R, 174/138 F, 60, 64, 65 R; 52/232; 138/156; 277/627

(56) References Cited

U.S. PATENT DOCUMENTS

| | | | | |
|---|---|---|---|---|
| 5,498,466 A | * | 3/1996 | Navarro et al. | 428/408 |
| 5,876,042 A | * | 3/1999 | Graf et al. | 277/627 |
| 5,947,159 A | * | 9/1999 | Takahashi | 138/156 |
| 6,029,412 A | * | 2/2000 | Gohlke | 52/232 |
| 6,176,052 B1 | * | 1/2001 | Takahashi | 52/232 |

* cited by examiner

Primary Examiner—Chau N. Nguyen
(74) Attorney, Agent, or Firm—Sidley Austin Brown & Wood, LLP

(57) ABSTRACT

A fire-protection sleeve (1) for a pipe, cable and the like (T) has an axially extending tubular metal housing (2), which has a radially outwardly projecting connecting flange (3) at one end. An end section (6), at the one end of the housing (2), contains a heat-intumescing composition (10), formed on the inner wall of the housing (2) and surrounds the axis of an axially extending opening (9) in the tubular housing (2) for the pipe, cable and the like (T). At the end section (6) of the housing (2) having the heat-intumescing composition (10), metallic lamellas (12) are arranged, which extend radially inwardly into the opening (9) of the housing (2) for the pipe, cable or the like (T) and are flexible in the axial direction of the opening (9).

8 Claims, 2 Drawing Sheets

FIRE-PROTECTION SLEEVE FOR PIPES, CABLES AND THE LIKE

FIELD OF INVENTION

The invention relates to a fire-protection sleeve for pipes, cables and the like, formed of an axially extending tubular metal housing with a radially outwardly extending flange at one end. A heat-intumescing composition is located within the housing at the one end and encircles an opening through the housing arranged to receive a pipe, cable and the like.

BACKGROUND INFORMATION AND PRIOR ART

Fire-protection sleeves are used as fire-protection elements for holes through masonry walls, ceilings or floors of buildings. In the case of combustible or fusible pipes, cables and the like of plastics material, glass or aluminum, the sleeves are intended to close off openings in masonry, in order to prevent penetration of fire through the opening. Known fire-protection sleeves usually have a tubular configuration and are used, for example, as space holders in an early building phase. In these cases, they are mounted on a form and cast into the concrete. In this way, the concrete wall part is already provided with a masonry opening. During the installation in a later building phase or during a subsequent enlargement, fire-protection sleeves, as closing-off sleeves, are inserted from one side into a previously produced opening in the masonry. The known fire-protection sleeves have a metal or plastics material housing, into which a sufficient amount of a heat-intumescing composition is integrated, which expands in the event of a fire and closes off the opening that results when the part or cable burns or melts away.

The larger the diameter of the opening that is to be closed off and the higher the pressure resulting from the fire, the more difficult it is to close off the opening, during a fire. In addition, in the event of a fire, the fire-protection sleeves with the heat-intumescing composition must be able to withstand the pressure of the jet of extinguishing water, used by the firefighters. For this purpose, systems are already known in the state of the art, for which the intumescence of the composition integrated into the fire-protection sleeves, is actively supported by mechanical components, such as springs, flaps, fiberglass fabric, and the like. The main function of these mechanical components is to support the slight expansion force of the heat-intumescing compositions or, since the latter are relatively expensive, to reduce the amount of intumescing composition. The known mechanical aides fulfill their function satisfactorily only if the diameters of the openings are relatively small. In the case of larger diameters, they are relatively unwieldy in use and make the fire-protection sleeve unduly more expensive.

The U.S. Pat. No. 4,888,925 discloses a sleeve-like pipe coupling, which is placed in an opening in masonry. The pipe coupling has as a tubular inner housing of plastics material with stops, which project into the interior, for the pipes, which are pushed in and are to be coupled. At one longitudinal end, the interior housing is surrounded by an annular metallic casing. The annular space between the metal casing and the inner housing is filled with a heat-intumescing composition. Metal brackets, radially projecting from the casing to the tubular inner housing, form the boundary of the annular space at the one longitudinal end of the pipe coupling. The radially extending brackets are to prevent the emergence of the intumescing composition from the annular space and serve to improve the introduction of heat in the event of a fire, so that the expansion of the heat-intumescing composition is reliably initiated. In the event of a fire, the tubular inner housing, together with the plastics material pipe that has been pushed in, burn away and the expanding composition is intended to seal the resulting opening. This effect functions satisfactorily in the case of smaller diameters. However, in the case of larger diameters, the known problems arise with the fire pressure, which exists in the case of a fire, and, optionally, with the water pressure caused by the jet of extinguishing water. This known pipe coupling is suitable only for pipes with the necessary nominal diameter. For pipes with smaller or larger diameters, a different pipe coupling is required. In addition, these known pipe couplings actually are not fire-protection sleeves, since the pipes cannot be passed through the device. Rather, the pipe coupling only joins together the longitudinal ends of individual pipes, which are pushed in at opposite longitudinal ends.

SUMMARY OF THE INVENTION

Therefore, it is a primary object of the present invention to improve the fire-protection sleeve so that, in the event of a fire, openings of a larger diameter can also be reliably closed off. The seal should also withstand a higher fire pressure and the pressure of the extinguishing water used by the firemen. The fire-protection sleeve is suitable for pipes, cables and the like of different diameters. Moreover, it is simple and inexpensive to manufacture the fire-protection sleeve.

This object is accomplished by a fire-protection sleeve with the following distinguishing features. Preferred variations and/or further development of the invention are set forth in the dependent claims. The fire-protection sleeve of the invention for a pipe, cable and the like comprises an essentially tubular metal housing, which has a radially outwardly protruding connecting flange at one longitudinal end. An axial end section of the housing has a heat-intumescing composition, which is disposed at the inner wall of the housing and circularly surrounds an axially extending opening for the pipe, cable and the like. At the axial end section of the housing having the heat-intumescing composition, metallic lamellas are disposed, which extend essentially radially inward from the casing of the metal housing into the opening for the pipe, cables and the like and are flexible in the axial direction.

Because of the flexibility of the metallic lamellas, projecting into the opening, pipes, cables or the like can be easily pushed through. The lamellas do not impede the pushing-in process. There is great latitude with respect to the diameter of the pipes, cables and the like, which can be pushed into the fire-protection sleeve with a given diameter of the opening. The axially flexible lamellas lie against the outer wall of the member that has been pushed in and hold it in a quasi-centered position in the fire-protection sleeve. In the event of a fire, during which the member, which has been pushed in, usually burns or melts away, the lamellas are surrounded by the intumescing composition. They do not actively participate in sealing the opening through the fire-protection sleeve. Instead, embedded in the expanding composition, they form a reinforcement for the sealing plug formed by the action of heat on the expanded intumescing composition. The reinforcement provides greater mechanical strength to the expanding composition in the event of a fire, so that the composition is better able to withstand the fire pressure arising in the event of a fire and, optionally, the pressure exerted by the directed extinguishing.

Since the lamellas are disposed in a rosette fashion and are at a distance from one another in the circumferential direction, they are embedded even better during the expansion of the intumescing composition. The expanding composition is deposited in the cavity between the lamellas and is tied in even better. For the intumescing compositions usually used, it proves to be advantageous if the lamellas, in the circumferential direction, are at least at a distance of about 1 mm to about 8 mm from one another.

Preferably, the lamellas are formed of a spring steel. By these means, it is ensured that individual lamellas are not broken when pipes, cables and the like are passed through. When a member is pushed in, the lamellas of spring steel are bent only reversibly and lie under tension against the outer wall of the pushed-in member. Whereby, on the one hand, excessive forces do not have to be overcome while pushing in a member and, on the other, there is a sufficiently stiff reinforcement for the intumescing composition in the event of a fire, the lamellas of spring steel have a wall thickness in the range of about 0.14 mm to about 0.4 mm. At these wall thicknesses, there is adequate axial flexibility and, at the same time, the danger that individual lamellas will break is small.

The degree, to which the lamellas are deformed when a pipe, cable and the like is inserted in the axial direction, depends on the diameter of the pipe inserted, as well as on the diameter of the opening, which is edged by the inner free ends of the lamellas. Advantageously, the lamellas therefore all have the same length. Moreover, they form the boundary of the opening, the diameter of which is at least 10 percent of the diameter of the tubular housing opening.

For manufacturing reasons, it is advantageous if the lamellas are constructed on an annular metallic body, which can be inserted into the housing. Preferably, the lamellas are formed in one piece with the annular metallic body.

BRIEF DESCRIPTION OF THE DRAWING

In the following, the invention is explained in greater detail with reference to an example of a fire-protection sleeve, shown in the Figures, some of which are diagrammatic and not to scale.

DETAILED DESCRIPTION OF THE INVENTION

Figure 1:
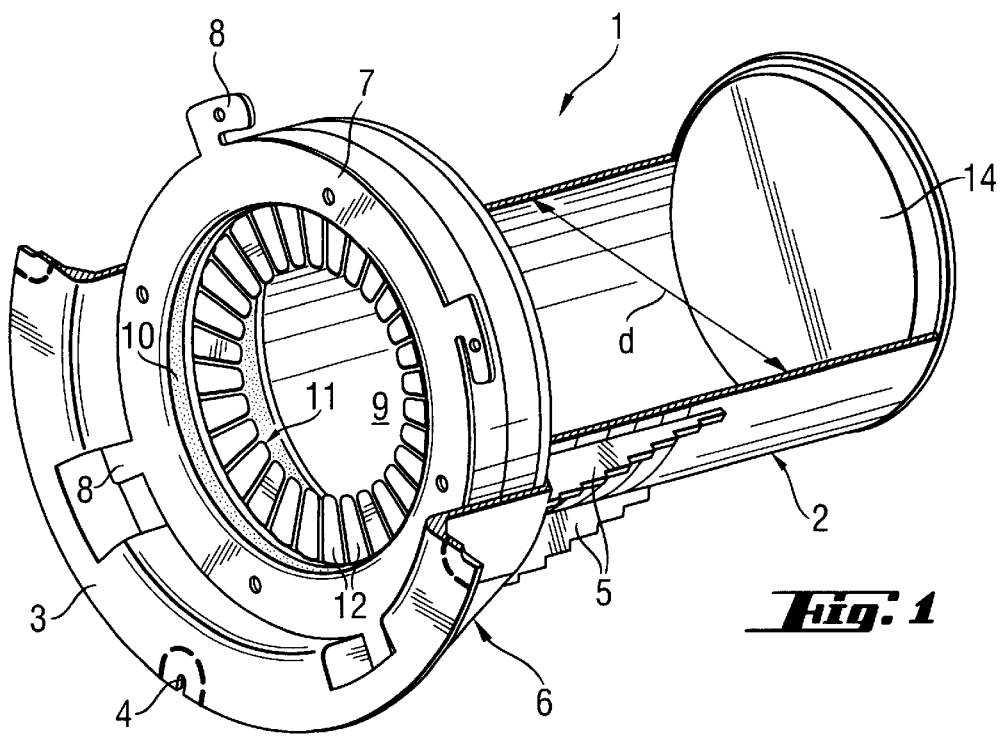
FIG. 1 is a perspective view, partly in section, of an inventive fire-protection sleeve.

A fire protection sleeve is shown in FIG. 1. It comprises an axially extending tubular housing 2 formed of metal, at the left axially extending end section 6 there is a connecting flange 3 which extends radially outwardly. The connecting flange 3 is provided with connecting devices 4, such as boreholes or the like, which enable the fire-protection sleeve 1 to be fastened to a concrete form or to a wall. At the outside of the tubular housing 2, radially projecting ribs 5 are provided, which prevent rotation of the fire-protection sleeve 1. At the axially extending end section 6 of the tubular housing, a closing part 7 is connected detachably with the housing 2. For this purpose, locking brackets 8 project radially outwardly from the periphery of the closing part 7, and engage corresponding recesses in the connecting flange 3 and lock behind shoulders. In the axial end section 6 of the tubular housing 2, a heat-intumescing composition 10 is provided. The heat-intumescing composition 10 is disposed at the inner wall of the tubular housing 2 and surrounds an axially extending opening 9 of the tubular housing 2 in annular fashion. The diameter d of the opening 9, is measured across the inner wall of the housing 2. In FIG. 1, the right end section of the tubular housing 2, opposite the connecting flange 3, is shown closed off by a lid 14. Optionally the lid 14 is detachable, for example, if the fire-protection sleeve 1 is to be equipped with a pipe only in a later phase of the building and if contamination of the opening 9 is to be prevented.

At the axially extending end section 6 of the tubular housing 2 accommodating the intumescing composition 10, axially flexible lamellas 12 are disposed, which extend in the radially inward direction and project into the opening 9 for a pipe, cable and the like.

Figure 2:
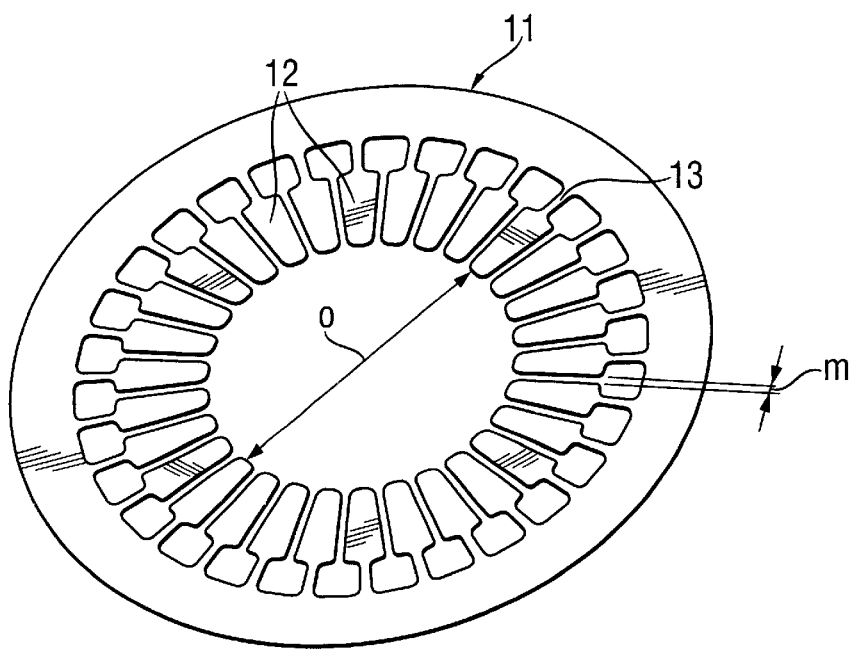
FIG. 2 is a view of the annular metallic body, with integrally constructed lamellas, as shown in FIG. 1.

FIG. 2 shows an annular body 11 with a number of lamellas 12, which are arranged in rosette fashion and project radially inward from the circumference. The annular body 11 is formed of a spring steel. The lamellas 12 are constructed integrally with the annular body 11 and are flexible in the axial direction of the opening 9. For this purpose, the lamellas 12 are connected over a flector 13 with the circumference of the annular body 11. The wall thickness of the lamellas 12 is about 0.15 mm to about 0.4 mm. The lamellas 12 are at a minimum distance from one another, which amounts to about 1 mm to about 8 mm. The lamellas 12 all have the same radially extending length and leave free an opening cross-section with a diameter O, which amounts at least to about 10% of the diameter d of the axially extending opening 9 (FIG. 1). The annular body 11 with the axially flexible lamellas 12 is mounted in the end section 6 of the tubular housing 2 and is fixed by the closing part 7. It is in the immediate vicinity of the heat-intumescing composition 10, which is also disposed in the end section 6 of the housing 2 (FIG. 1).

Figure 3:
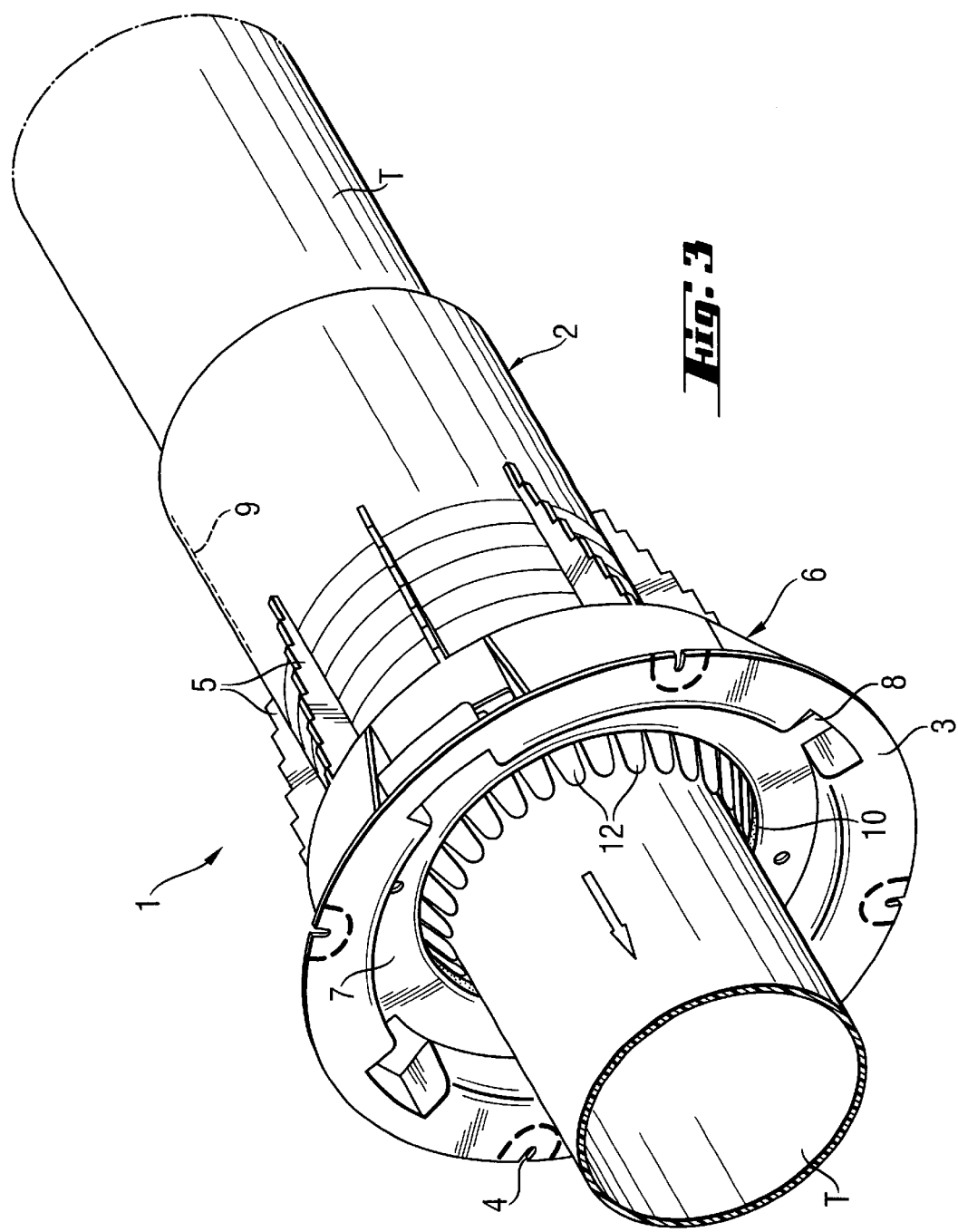
FIG. 3 is a perspective view of the fire-protection sleeve of FIG. 1, through which a pipe has been passed.

FIG. 3 shows the inventive fire-protection sleeve 1 of FIG. 1 with an inserted pipe T, which may consist, for example, of plastics material. The individual elements of the fire-protection sleeve 1 have the same reference numerals as in FIG. 1. The pipe T is pushed in from the side opposite the end section 6 of the housing 2. During this procedure, the flexible lamellas 12 are bent corresponding to the diameter of the pipe T. The lamellas 12 press against the outer surface of the pipe T and center the latter within the fire-protection sleeve 1. In the event of a fire, the pipe T burns or melts away and the intumescing composition 10, which is disposed at the inner wall of the end section 6, expands. The expanded composition 10 penetrates through and is deposited in the spaces between the lamellas 12. With this embedment, the lamellas 12 form a reinforcement for the expanding intumescing composition 10, which closes off the axial opening 9 of the housing 2.

What is claimed is:

1. A fire-protection sleeve for one of a pipe and a cable, comprises an axially extending tubular metal housing (2) with a radially outwardly projecting connecting flange (3) at one end section of said tubular housing (2), an axially extending opening (9) having a diameter (d) is formed through said tubular housing and arranged to receive the one of a pipe and a cable (T), a heat-intumescing composition (10) is located on an inner wall of said end section (6) of the tubular housing (2) and encircles said opening (9), wherein an annular arrangement of laterally spaced metallic lamellas (12) extend radially inwardly of said heat-intumescing composition and into said opening (9) and are flexible in the axial direction of said opening (9), and said lamellas are located in said end section (6) of said tubular housing in the region of said heat-intumescing composition (10) so that in the event of a fire the heat-intumescing composition expands radially inwardly and is deposited in the spaces between the lamellas whereby the lamellas reinforce the heat-intumescing composition.

2. A fire-protection sleeve, as set forth in claim 1, wherein the lamellas (12) are arranged in a rosette fashion at a distance from one another in the circumferential direction around the axis of said opening (9).

3. A fire-protection sleeve, as set forth in claim 2, wherein the lamellas (12) have a minimum spacing (m) in the circumferential direction between adjacent lamellas (12) in the range of about 1 mm to about 8 mm.

4. A fire-protection sleeve, as set forth in claim 1, wherein the lamellas (12) are formed of a spring steel.

5. A fire-protection sleeve, as set forth in claim 4, wherein said lamellas (12) have a wall thickness in the axial direction of the opening (9) in the range of about 0.15 mm to about 0.4 mm.

6. A fire-protection sleeve, as set forth in claim 1, wherein said lamellas (12) have the same length in the radially inward direction with the radially inner ends thereof forming a passageway with a diameter (O) at least 10% of the diameter (d) of the opening (9).

7. A fire-protection sleeve, a set forth in claim 1, wherein said lamellas (12) are formed extending radially inwardly from an annular metallic body (11) fitted into the opening (9) in said tubular housing (2).

8. A fire-protection sleeve, as set forth in claim 7, wherein said lamellas (12) are formed integrally with said annular body (11).

* * * * *